Jan. 8, 1929.

H. YSSKIN 1,698,523

SPRING WHEEL

Filed Dec. 2, 1927

INVENTOR
Herman Ysskin,
BY
Wm H. Canfield,
ATTORNEY.

Patented Jan. 8, 1929.

1,698,523

UNITED STATES PATENT OFFICE.

HERMAN YSSKIN, OF NEWARK, NEW JERSEY.

SPRING WHEEL.

Application filed December 2, 1927. Serial No. 237,151.

This invention relates to a spring wheel which has a structure interposed between the hub and the rim, which structure is normally stiff enough to carry the load of a vehicle with but slight movement of the parts but which can develop a considerable degree of elasticity under heavy loads or abnormal strains so that the movement of the vehicle is easy under these various conditions and the riding is smooth without the necessity of pneumatic tires.

The wheel is adapted for various types of vehicles but the form illustrated is one that has been found successful in operation on trucks and automobile busses and other forms of heavier vehicles which heretofore have transmitted motion of the vibration of travel to the body of the vehicle.

Figure 1:
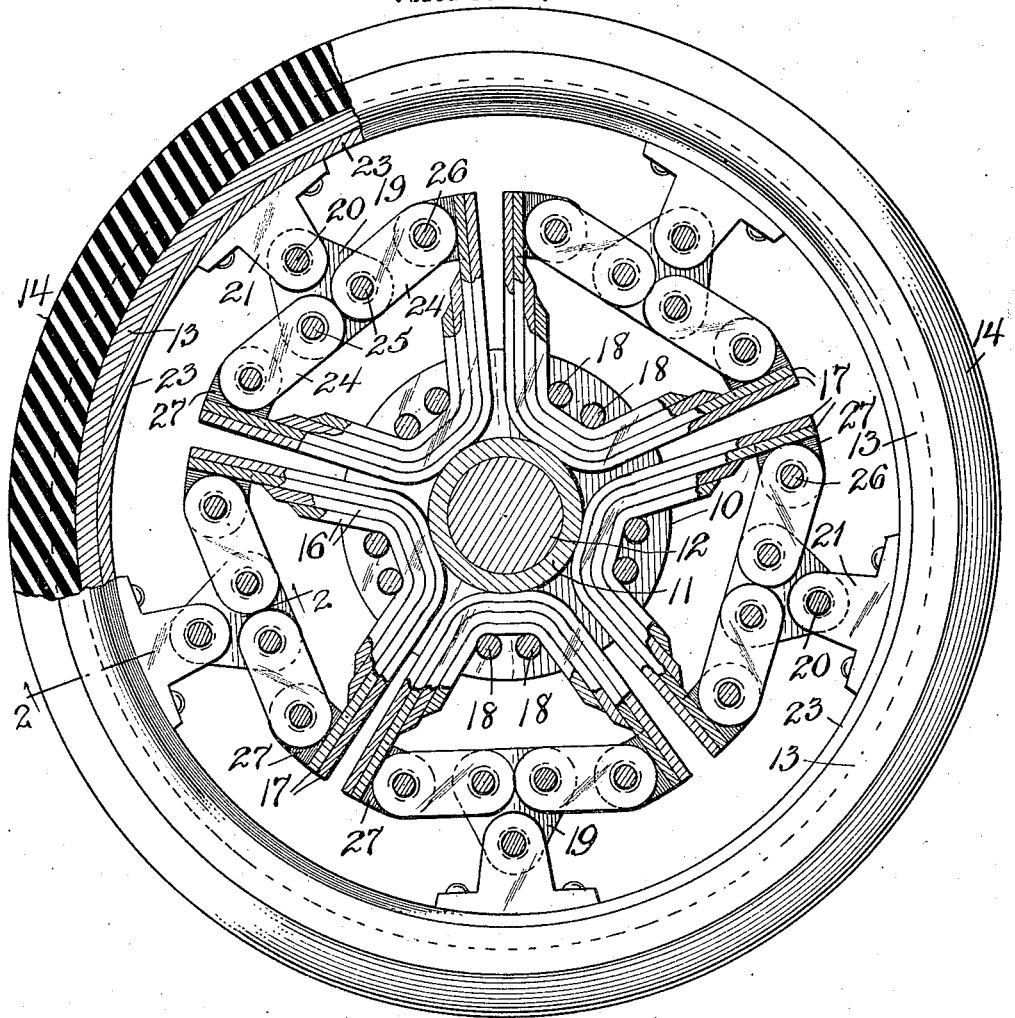
Figure 2:
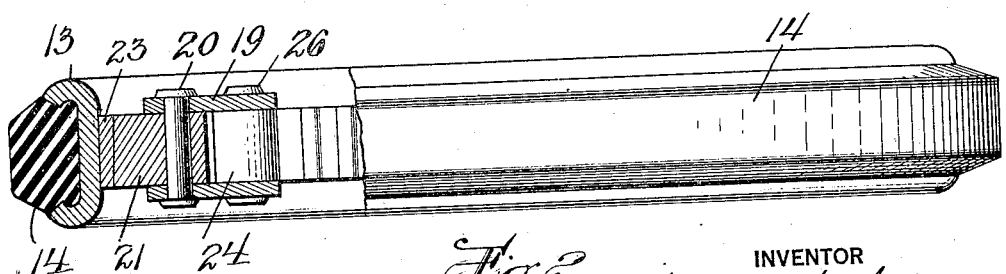

The invention is illustrated in the accompanying drawings in which Figure 1 is a side view of a spring wheel made according to my invention with various parts thereof broken away to more clearly illustrate the construction of the wheel. Figure 2 is a bottom view of the structure shown in Figure 1, the left hand end being a sectional view on line 2—2 in Figure 1.

The wheel is provided with a hub of any usual form usually consisting of opposed flanges 10, one in each side of the wheel, and forming a bearing 11 connecting them into which the axle 12 is located. Surrounding the hub and spaced thereof is the rim 13 which receives a tire 14, these parts being constructed in any desired manner and having any form of tire to suit the character of the vehicle, these parts as so far described being the ordinary elements of a wheel and not being novel.

I arrange a set of springs side by side in circular relation and bend the springs into a U-shape and secure them to the hub with their free ends projecting outwardly. I prefer to form these springs of leaves which are each successively shorter in length and then the spring so assembled is bent into a U-shape.

In the drawing I show such springs at 15 made up of spring leaves 16 and bent into U-shape with the ends 17 of the longest of the leaves forming the projecting ends. Bolts 18 are spaced across the wheel between the hub flanges 10 and the angles of the U-shaped springs to hold these springs firmly in position against lateral movement of outward movement and the springs rest against the bushing 11 which prevents any inward movement. To the rim 13 I secure rocker arms 19, these being pivoted as at 20 and in the form shown the rocker arms are secured to bearings 21 which are in turn secured to the band 23 which is secured to the inner face of the rim. This construction carries with it a degree of flexibility which is an advantage in many cases over the direct securing of the rocker arms to the rim.

It will be noted that the rocker arms are spaced apart and arranged each one opposite a spring and arranged between the ends of a spring. Each of these rocker arms is connected to its respective springs by links 24 which are pivoted as at 25 to the rocker arms on opposite sides of the pivot 20 and at 26 to the oposite ends of a spring, usually to the ears 27 which are bent over from a leaf at the ends of the spring.

In this construction while each of the elements is a separate spring unit they are close enough together to enable one to engage the next when unduly or excessively flexed and the distribution of the strains in this way provides a durable spring wheel. The parts are so proportioned that in normal position the links 24 project straight across between the ends of a spring so that inward pressure from the rim by means of the rocker arm will have a tendency to pull the ends of the spring toward each other while at the same time any tortional strain is taken up in a circumferential direction by the movement of one spring toward the next as in the case of a wheel used for driving the vehicle.

It will be evident that many changes can be made in the construction and arrangement of the parts without departing from the scope of the invention.

I claim:—

1. A spring wheel comprising a hub, a set of U-shaped springs secured to the hub with their ends extended, a rim, a set of rocking arms secured to the rim, one for each spring, and links connecting the rocking arms with the ends of the springs.

2. A spring wheel comprising a hub, a set of U-shaped springs arranged side by side around the hub and secured thereto with their ends extended, a rim, rocking arms pivoted to the rim, each arm between the ends of a spring, and links pivoted each to the end of a spring and to the rocking arm opposite the spring.

3. A spring wheel comprising a set of U- shaped springs arranged side by side in circular relation and secured with their free ends projecting, rocking arms secured to the rim of the wheel and each between the ends of a spring and links securing the said ends to the rocking arms.

4. A spring wheel comprising a series of springs each spring consisting of leaves successively shorter and bent into U-shape with the longest leaves on the outside, securing means for fastening the springs with their free ends projecting outwardly, a rim, a set of rocker arms each pivoted to the rim and located between the ends of a spring, and links each pivoted to one of the outer ends of a spring and to the respective rocker arm on one side of its pivot to the rim.

In testimony whereof I affix my signature.

HERMAN YSSKIN.